No. 683,203. Patented Sept. 24, 1901.
H. GRUBB.
SIGHTING DEVICE FOR GUNS.
(Application filed Dec. 26, 1900.)
(No Model.) 6 Sheets—Sheet 1.
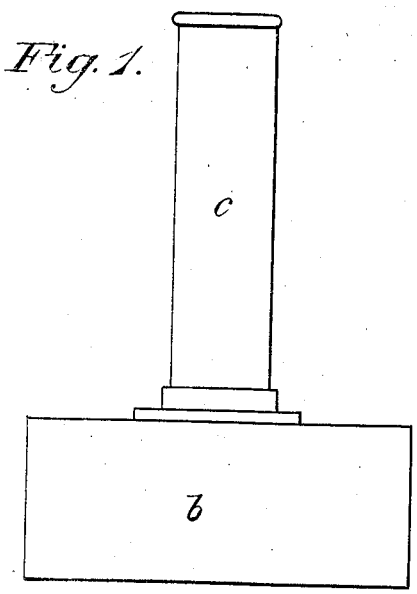
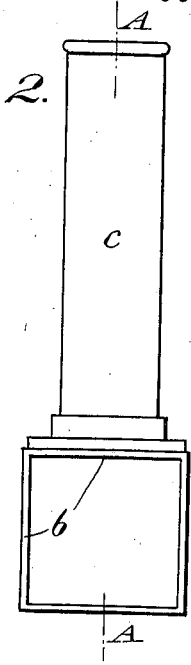
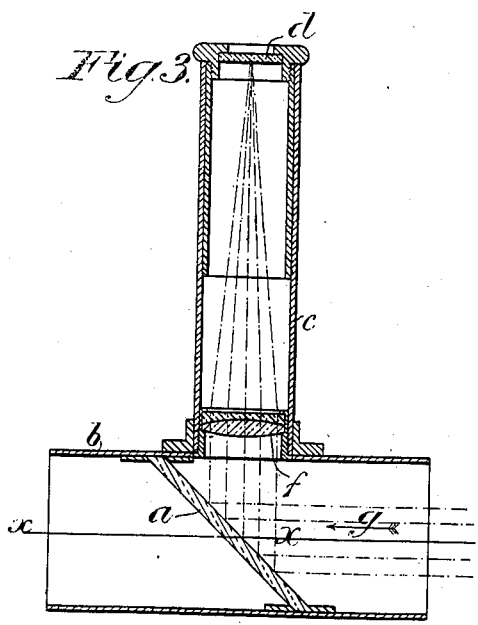
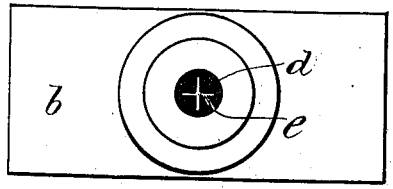
Witnesses.
Marcus L. Byng.
Alfred H. Hardwell
Inventor.
Howard Grubb
By Julian A. Dowse
His Attorney.

No. 683,203. Patented Sept. 24, 1901.
H. GRUBB.
SIGHTING DEVICE FOR GUNS.
(Application filed Dec. 26, 1900.)
(No Model.) 6 Sheets—Sheet 2.
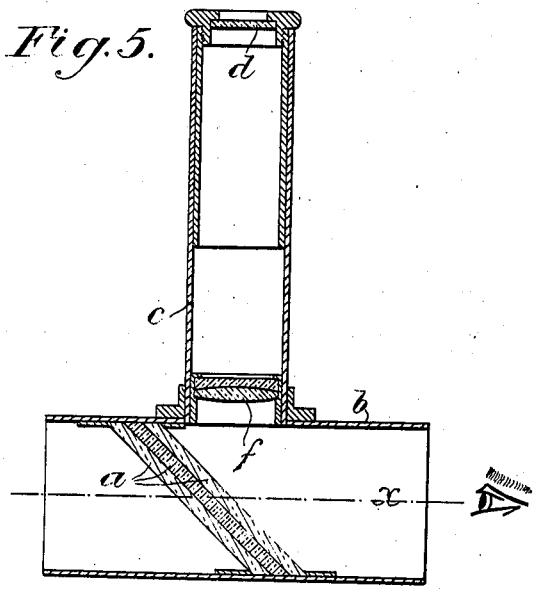
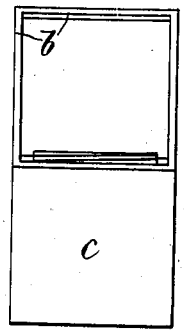
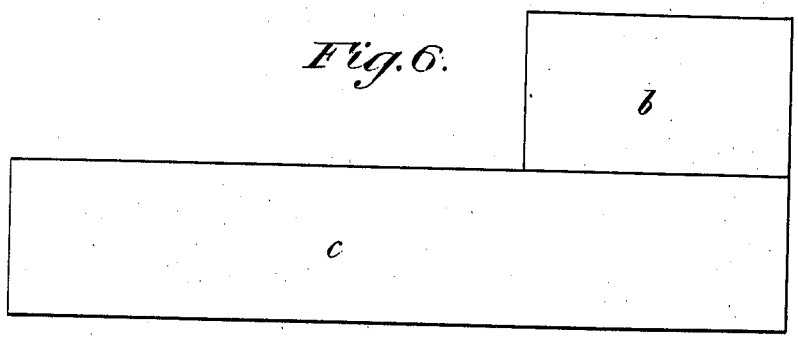
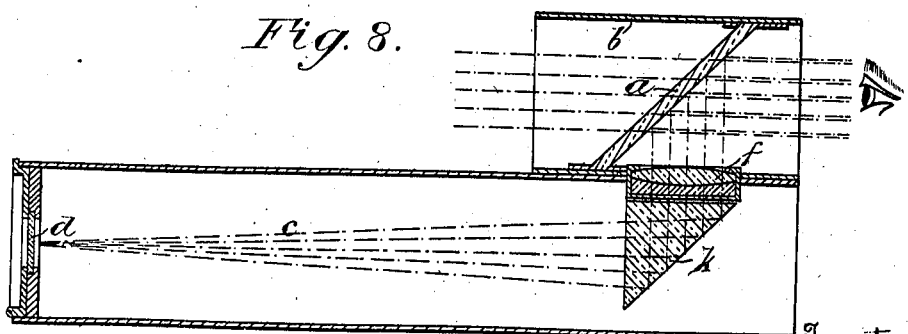
Witnesses.
Inventor
Howard Grubb
By his Attorney.

No. 683,203. Patented Sept. 24, 1901.
H. GRUBB.
SIGHTING DEVICE FOR GUNS.
(Application filed Dec. 26, 1900.)
(No Model.) 6 Sheets—Sheet 3.
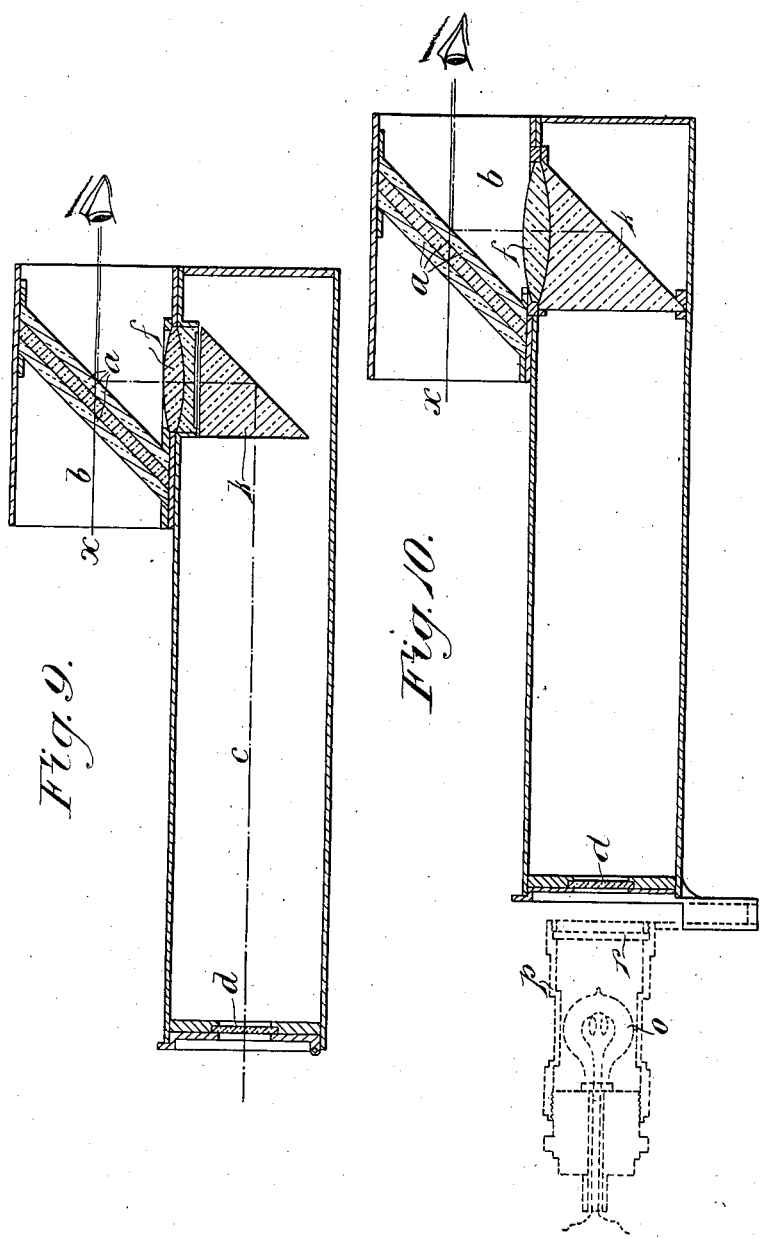

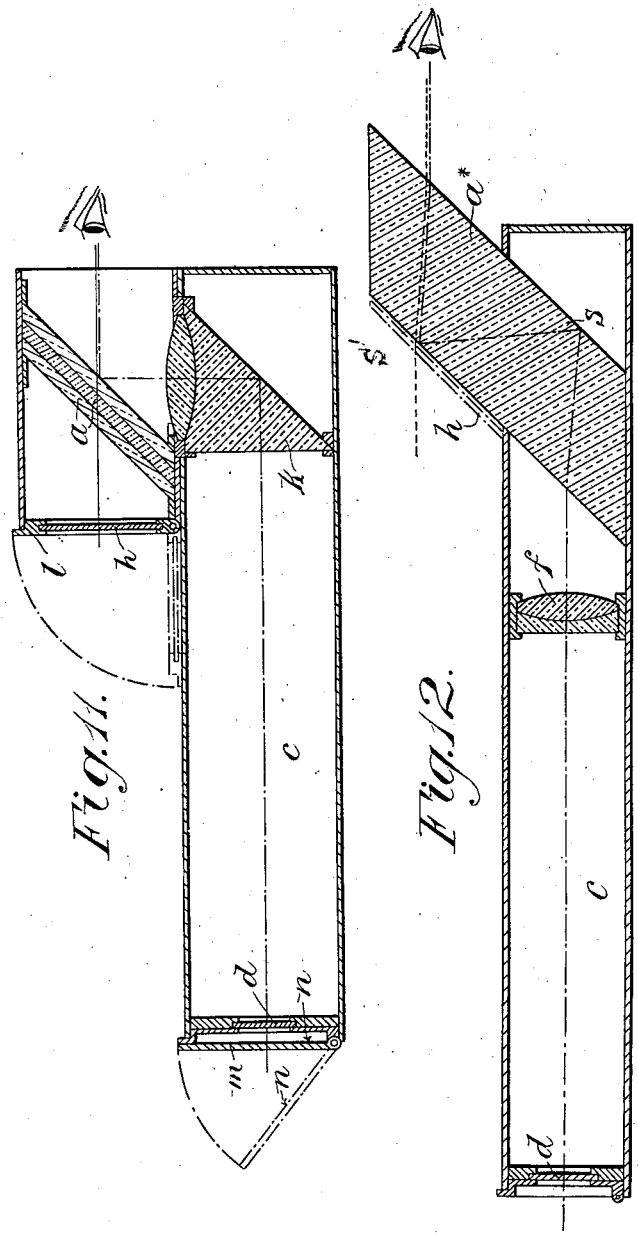

No. 683,203. Patented Sept. 24, 1901.
H. GRUBB.
SIGHTING DEVICE FOR GUNS.
(Application filed Dec. 26, 1900.)
(No Model.) 6 Sheets—Sheet 5.
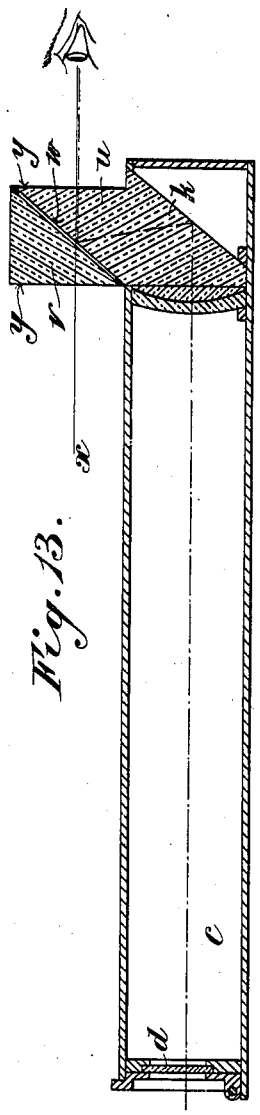
Fig. 13.
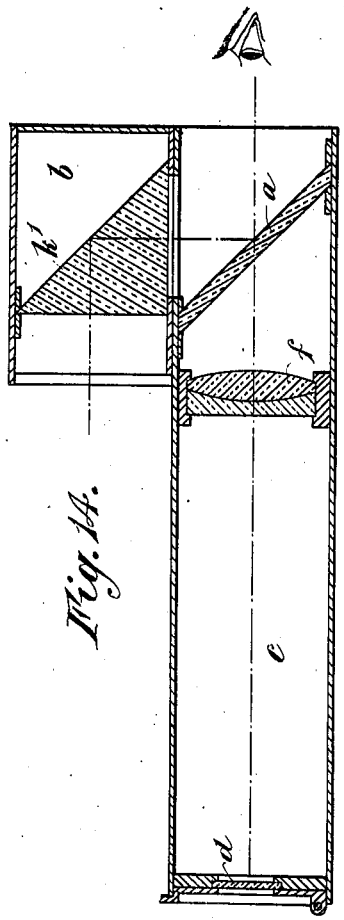
Fig. 14.
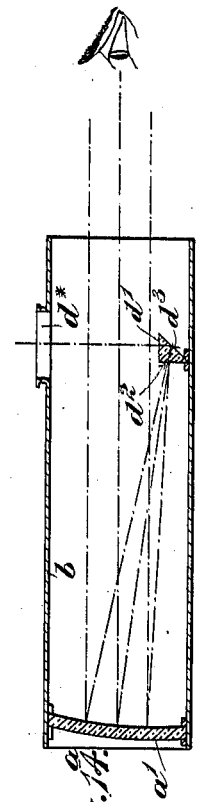
Fig. 14.ᵃ
Witnesses
Marcus L. Byng.
Osgood W. Doull
Inventor
Howard Grubb
By Julian A. Doull
His Attorney.

No. 683,203. Patented Sept. 24, 1901.
H. GRUBB.
SIGHTING DEVICE FOR GUNS.
(Application filed Dec. 26, 1900.)
(No Model.) 6 Sheets—Sheet 6.
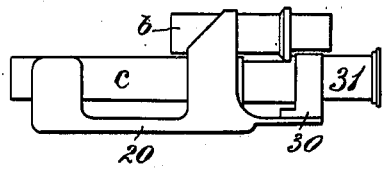
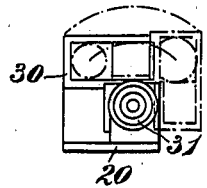
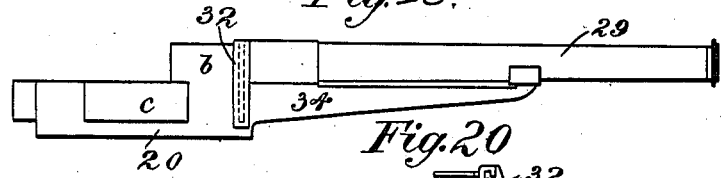
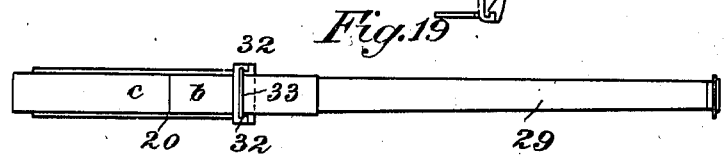
Witnesses
Marcus L. Byng.
Inventor
Howard Grubb
By his Attorney.

UNITED STATES PATENT OFFICE.

HOWARD GRUBB, OF DUBLIN, IRELAND.

SIGHTING DEVICE FOR GUNS.

SPECIFICATION forming part of Letters Patent No. 683,203, dated September 24, 1901.

Application filed December 26, 1900. Serial No. 41,152. (No model.)

*To all whom it may concern:*

Be it known that I, HOWARD GRUBB, Knight, a subject of the Queen of Great Britain and Ireland, residing at Dublin, Ireland, have invented Improvements in Sighting Devices for Guns, of which the following is a specification.

This invention has reference to a simple construction of sighting devices for use with small-arms, guns, and ordnance (all hereinafter included in the term "guns" where not inconsistent with the context) whereby a distant object can be sighted in an easier manner and with less skill than with the sights heretofore usually employed. A sighting device for this purpose according to this invention is so constructed that the distant object to be sighted or an image thereof and an image of an object carried by the sighting device and constituting the sight proper can be superposed or caused to coincide in such a way that they can be seen simultaneously and that the said image or sight proper shall appear to be approximately as far distant as the object being sighted, so that it can be viewed under practically the same optical conditions as the distant object. According to one construction such a sighting device comprises one or more pieces of parallel glass or equivalent material inclined to the line of sight and through which the object to be sighted can be seen and means whereby there can be partially reflected from the two surfaces of the piece of parallel glass or of each piece of parallel glass an image of a sight, the rays of light from which are rendered parallel by being passed through a lens of convex power before they reach the reflecting-surfaces of the piece or pieces of parallel glass, the arrangement being such that the object and image can be seen simultaneously and that the image will appear to be as far distant as the object and will be viewed under practically the same optical conditions as the object, so that upon moving the gun to which the sighting device is applied sufficiently to cause the object and image to coincide the gun will be correctly sighted for the said object.

In a modified construction the parallel glass is replaced by two right-angled prisms arranged with their adjacent inclined surfaces near or close together and at an angle to the line of sight, while the vertical surfaces of the prisms are at right angles to the line of sight. According to another construction the object and image are seen simultaneously and under the same optical conditions as before; but the object is seen by reflection and the image directly. In another construction the luminous rays from the sight are rendered parallel by reflection from a concave reflector instead of by refraction through an object-glass. In each case the coincidence of the object and image is not affected by the position of the eye of the observer, so that it is not necessary to keep the eye stationary or even near to the sighting device.

Sighting devices of the kind described can be constructed in various forms and applied to guns in various ways.

In the accompanying illustrative drawings, Figure 1 is a side elevation, Fig. 2 an end view, Fig. 3 a longitudinal section on the line A A of Fig. 2, and Fig. 4 a plan, showing one construction of sighting device according to this invention. Fig. 5 is a similar view to Fig. 3, showing a modification. Figs. 6, 7, and 8 are similar views to Figs. 1, 2, and 3, respectively, showing a modified construction of the sighting device. Figs. 9 to 14$^a$, inclusive, are similar views to Fig. 8, showing further modified constructions of the sighting device. Figs. 15 to 33, inclusive, show how sighting devices according to this invention can be applied to guns of various kinds. Figs. 15, 16, and 17 are respectively side, end, and plan views showing a magnifying-eyepiece combined with the sighting device. Figs. 18 and 19 are side and plan views, respectively; and Fig. 20 is a detail view showing an ordinary telescope combined with the sighting device.

In the sighting device shown in Figs. 1, 2, and 3, $a$ is an inclined piece of parallel glass arranged within a holder $b$ in the form of a tube, (hereinafter called the "sighting-tube,") that is adapted to be suitably mounted on a gun, the piece of parallel glass being fixed within the sighting-tube at an angle of forty-five degrees to the longitudinal axis thereof which corresponds to the line of sight $x$. Fixed at right angles to the sighting-tube is a second tube $c$, that is provided at its outer or upper end with an opaqe diaphragm $d$, formed with a transparent design $e$, Fig. 4, through which light can pass and a ghost or phantom image of which is to be reflected in a backward direction from the inclined piece of parallel glass. The diaphragm $d$ may conveniently be of glass covered with some opaque material—for example, a coating of silver or other metal or paint—through which a design $e$ is cut, so as to appear as a bright design upon a black ground when viewed by transmitted light. In the example Fig. 4 the design $e$ consists of two fine transparent lines arranged at right angles to each other, so as to form a transparent cross. The design may, however, be of any other shape—for example, a circle. At the inner end of the tube $c$ (hereinafter called the "collimating-tube") and near its junction with the sighting-tube $b$ is an achromatic lens $f$, of convex power, (hereinafter called the "object-glass,") which gives the necessary parallelism to the rays of light coming from the diaphragm $d$ before they reach the reflecting-surfaces of the inclined piece of parallel glass from which they are reflected to the eye of the observer. For this purpose the position of the object-glass $f$ should be such that its principal focus will be in the same plane as the diaphragm $d$. The outer end of the collimating-tube $c$ must be so arranged that when the sighting device is in use the diaphragm $d$, with transparent design $e$, will be illuminated by natural or artificial light. With the arrangement described when an observer looks through the sighting-tube $b$ in the direction shown by the arrow $g$, Fig. 3, it is possible to see the object aimed at with practically the same amount of distinctness and brilliancy as if the piece of parallel glass $a$ were not present, and by suitably adjusting the position of the sighting device the center of the phantom image of the cross $e$ can be caused to coincide in position with the said object, the said image being partially reflected from the two surfaces of the piece of parallel glass, and thus reflected into the eye simultaneously with a view of the object. If the parts be arranged as described and shown, the rays of light entering the eye after reflection from the parallel glass will be parallel rays, and therefore any object, such as the cross $e$, placed in the plane of the diaphragm will be seen under the same conditions as if it were a large object placed at a great distance instead of what it really is—viz., a small object placed at a small distance—and if the two surfaces of the glass be perfectly parallel the two images as seen reflected from the two surfaces will be accurately superposed, so as to appear as a single image. Therefore on looking through the sighting-tube $b$ the object will be seen under practically the normal conditions of vision, and superposed upon the object will be seen the ghost or phantom image of whatever device $e$ has been formed on or in the diaphragm $d$, the brilliancy of this image depending upon the relative brilliancy of the sky or other source of light used to illuminate the diaphragm as compared with the brilliancy of the object itself. In some cases it is difficult with the arrangement above described to obtain a sufficient brilliancy of the phantom image, the worst conditions probably being when the sky overhead is of a deep-blue color, while the object aimed at is very bright. Under most circumstances, therefore, it will be advantageous to use several pieces of parallel glass arranged one immediately behind the other, as illustrated in Fig. 5, where three pieces $a$ of parallel glass are used. In this way the brilliancy of the phantom image will be increased by reason of the fact that the reflections from the whole six surfaces of the three pieces of parallel glass are superposed one upon another. For a like purpose when using a single piece of glass the reflecting power of one of its surfaces may be suitably increased—as, for example, by coating it with a film of metal (for example, silver) or of sulfid of lead, which, however, must be so thin as not to seriously interfere with the transparency of the glass. Also it is sometimes desirable to place a piece $h$ of faintly-tinted neutral glass across the front end of the sighting-tube $b$, as shown in Fig. 11, whereby the brilliancy of the object aimed at is reduced and the comparative brilliancy of the phantom image increased.

In the simpler and more convenient form of sighting device shown in Figs. 6, 7, and 8 the collimating-tube $c$ is placed below the sighting-tube $b$ and parallel to it, the light being bent by means of an inclined reflecting-surface before it passes through the object-glass $f$ and reaches the parallel glass $a$. In the example the reflecting-surface is formed by the inclined back surface of a right-angled prism $k$ of suitable glass, such as light flint-glass. The right-angled prism $k$ may have plane surfaces and be used in conjunction with an object-glass $f$, as shown in Figs. 8 and 9, or the object-glass and prism may be combined in the form of what is usually called an "object-glass" prism, as shown in Figs. 10 and 11. As hereinbefore mentioned, a piece of neutral tint-glass $h$ may be placed in front of the sighting-tube $b$, either attached rigidly thereto or, as shown in Fig. 11, mounted in a hinged frame $l$, as under some conditions better results will be obtained without its use and under other conditions of illumination with its use. Also it is desirable in most cases to provide at the outer or forward end of the collimating-tube $c$, outside the diaphragm $d$, a hinged metallic cap or shutter $m$, Fig. 11, which when closed against the said tube $c$ serves to protect the diaphragm $d$ from injury and from dust or rain. This shutter $m$ may be provided on its inner side with a reflector $n$, of silvered plate or other suitable reflecting material, which when the shutter is partly open serves to reflect the light of the sky into the collimating-tube $c$ and to illuminate the design on the diaphragm d. When using the sighting device in a casemate-battery or between decks on a naval gun, the shutter m is best left completely open, so as to utilize the light coming through the casemate or port-hole; but under other circumstances, such as with a field-gun, it will be found more advantageous to use the shutter half-way open, so as to reflect the skylight into the collimating-tube c through the diaphragm d. Under certain circumstances—as, for example, when it is desired to use the sighting device at night—it is desirable to illuminate the diaphragm by artificial light, which may conveniently be effected by placing a small electric lamp o, located within a casing p, in front of the diaphragm d, as shown in dotted lines in Fig. 10, a piece of opal or muffed glass r being preferably placed between the lamp and the diaphragm.

In the modified construction shown in Fig. 12 a sighting-tube is dispensed with in order that there may be nothing to obstruct the field of view around the plate or plates of parallel glass. In this case the collimating-tube c is made as before, with its diaphragm d and object-glass f complete in itself, and the reflecting arrangement is made in the form of a single piece of very thick glass a, having parallel surfaces and inclined at an angle of forty-five degrees to the axis of the collimating-tube. In this arrangement parallel rays of light coming from the object-glass f will pass first into the lower half of the piece of glass a and reach the back surface thereof, which at the part marked with the thick line s is silvered, so that the rays will be almost totally reflected therefrom. The rays then pass in the direction shown by the dotted lines to the upper part of the inclined front surface s' of the piece of glass, whence they are partially reflected backward into the eye of an observer. By using a thick piece of glass a, as shown, there will be little or no objection to leaving it quite unprotected, and it will enable a complete field of view to be obtained that is unobstructed by any opaque material above the collimating-tube. To obtain the best results with this arrangement of sighting device, the diaphragm d should be strongly illuminated, as there is only a single and therefore slight reflection of the rays of light from the inclined front surface s' of the piece of glass a. To increase the brilliancy of the phantom image reflected from the inclined surface s', a piece of very light neutral tinted glass h may be arranged near to but not in optical contact with the said surface s', as shown in dotted lines in Fig. 12. This would have the effect not only of reducing the brilliancy of the distant object seen directly through the piece of glass, and therefore increasing the comparative brilliancy of the phantom image, but would also enable the reflections from both surfaces of the piece of neutral tinted glass to be utilized to increase the brilliancy of the image, or the surface s' may have a very thin semitransparent metallic or other reflective coating—for example, silver or sulfid of lead—deposited on it to increase its reflecting power. If, however, the diaphragm d of the said sighting device, Fig. 12, have combined with it an electric lamp, the brilliancy of the phantom image will for many purposes be quite sufficient without using the piece of neutral tinted glass h or coating the surface s' with a reflecting-film.

In the sighting device shown in Fig. 13 the parallel glass is replaced by two right-angled prisms u and v, of crown-glass, arranged as shown, so that their adjacent inclined surfaces w are near together, but not in actual contact with each other, and are inclined at an angle of about fifty degrees to the line of sight x, while their vertical surfaces y are at right angles to the line of sight. The two prisms may be held together by an interposed layer of suitable adhesive material placed between them near to their outer sides only. The object-glass prism k is shown as made in one piece with the adjacent prism u; but it may be made separate from such prism u, if desired. In the former case the glass prism k, which will then be of crown-glass, should be silvered on its inclined rear surface to render the same reflecting. In this arrangement it will be seen that the parallel rays of light coming from the object-glass f enter and leave the vertical surfaces of the combined prisms k and u at right angles to such surfaces, so that there will be little loss of such light in passing through the prisms, while by the use of the prism v a second inclined reflecting-surface w is obtained which will nearly double the brilliancy of the phantom image produced. The prisms u and v will allow of the greater portion of the light from a distant object passing through them, only a small amount of such light being reflected from the inclined surfaces w. Instead of arranging the inclined surfaces w at an angle of about fifty degrees to the line of sight the right-angled prisms u and v may be made with angles of forty-five degrees, so that the said surfaces w will be inclined at forty-five degrees to the line of sight if the said two surfaces be cemented together, as by Canada balsam, and one of them be previously coated with a semitransparent film or coating of a reflecting substance, such as silver.

In the modified construction shown in Fig. 14 a prism k', preferably of light flint-glass, is arranged in the tube b and the inclined piece of parallel glass a is arranged below it in the tube c and behind the object-glass f. One of the surfaces of the piece of parallel glass a is preferably coated with a film of silver of such a thickness as to be not quite opaque, so as to increase its reflecting power, while still leaving it sufficiently transparent to enable an image of the design on the diaphragm d to be seen by the parallel luminous rays passing through it. With this arrangement the distant object will be seen by reflection from the inclined reflecting-surface of the prism $k'$ and the inclined reflecting-surface of the parallel glass $a$, while a direct image of the design on the diaphragm $d$ will be produced by the parallel rays of light proceeding from the object-glass $f$, so that the said object and image can be seen simultaneously and the image will appear to be approximately as far distant as the object and can be viewed under the same optical conditions as such object, as in the other arrangements of sighting devices hereinbefore described. Instead of rendering the luminous rays proceeding from the sight parallel by refraction through a convex lens—i. e., an object-glass, as in the arrangements hereinbefore described—they may be rendered parallel by reflection from a concave reflecting-surface. Fig. 14$^a$ shows one construction for this purpose wherein a prism $d'$ is arranged within the sighting-tube $b$ opposite an opening $d^*$ and behind a piece of clear glass $a'$, that is concave on its rear side and convex on its front side, the radii of the two surfaces being nearly equal. The prism $d'$ is placed at the principal focus of the rear concave surface of the reflector $a'$, the optical axis of the reflector being preferably inclined to the axis of the tube. The front side $d^2$ of the prism is coated with some opaque material, such as varnish or paint, to form a diaphragm, through which a design such as a fine cross or circle is cut to constitute a sight, as before. This sight is illuminated from behind by light that passes through the opening $d^*$ and falls upon and is reflected from the inclined rear surface $d^3$ of the prism, the diverging luminous rays from the sight impinging upon the rear concave surface of the reflector, from which they are reflected backward as parallel rays. The arrangement is such that a distant object can be seen directly through the concave reflector and the image of the sight can be superposed on it and the two viewed together, as in the other arrangements of sighting device hereinbefore described. To increase the brilliancy of the image of the sight, the inner concave surface of the reflector $a'$ may be coated with a semi-transparent film of a reflecting medium, such as silver or sulfid of lead, like some of the plane reflectors hereinbefore described. The opening $d^*$ may be glazed with opal or ground or clear glass and may in the latter case have a mirror mounted over it to direct light therethrough.

Sighting devices according to this invention can be used by the unaided eye or in connection with a telescope, field-glass, or equivalent device for more distinctly observing the object to be sighted. As the rays entering the eye from the object and from the phantom sight are practically parallel, a field-glass or other form of telescope can be used to view the superimposed images of object and phantom sight which will simultaneously be in focus. Also such sighting devices may be constructed in forms other than those hereinabove indicated as examples.

A sighting device of the kind described can be mounted upon a gun in any suitable or known way to allow for angular movement in vertical and horizontal planes to suit variations in range, wind-pressure, and the other variable conditions to which such devices must comply.

Figs. 15, 16, and 17 show how an eyepiece of well known construction having two pairs of reflecting-prisms and an object-glass and designed to magnify the image of the sight and the view of a distant object can be applied to the sighting device in such a way that it can be brought into position to facilitate the observation of the image of the sight and a distant object or can be moved out of position, as may be desired. For this purpose the carrier 20, in which the sighting device $b\ c$ may be held, is provided with a bearing 30, in which the said eyepiece 31 is mounted to turn about a horizontal axis, so that it can at will be turned either into the operative position shown in full lines in Figs. 15, 16, and 17 or into the inoperative position shown in dotted lines in Figs. 16 and 17.

Figs. 18, 19, and 20 show how an ordinary telescope 29 can be used in connection with the sighting device $b\ c$ for sighting objects at a great distance. For this purpose the rear end of the sight-carrier 20 is formed with a pair of vertical guides 32, Fig. 20, to receive and hold the rim 33 on the forward end of the telescope and with a backwardly-projecting extension 34 to serve as a rest for the body of the telescope, as shown in Fig. 18.

What I claim is—

1. A sighting device for guns, comprising a sight and means whereby luminous rays proceeding therefrom to the eye of an observer are rendered parallel to one another.

2. A sighting device for guns, comprising a sight and means whereby luminous rays proceeding therefrom can be rendered parallel to one another and there is produced an image that can be superposed upon and viewed simultaneously with a distant object.

3. A sighting device for guns, comprising a sight, means for rendering luminous rays proceeding therefrom parallel to one another, and a surface from which an image of the sight produced by the parallel luminous rays can be reflected and caused to enter the eye of an observer simultaneously with a view of a distant object.

4. A sighting device for guns, comprising a sight, means for rendering luminous rays proceeding therefrom parallel to one another, and reflecting-surfaces whereby views of the sight and a distant object can be superposed and viewed simultaneously.

5. A sighting device for guns, comprising a sight, means whereby luminous rays proceeding therefrom can be rendered parallel before reaching the eye of an observer, and means whereby the brilliancy of a distant object, as seen by the said sighting device, can be diminished.

6. A sighting device for guns, comprising a sight, means for illuminating said sight, and means whereby luminous rays proceeding from said sight can be rendered parallel before reaching the eye of an observer.

7. A sighting device for guns comprising a sight, a lamp for illuminating said sight, and means whereby luminous rays proceeding from said sight can be rendered parallel to one another.

8. A sighting device for guns, comprising a sight, means whereby luminous rays proceeding therefrom are rendered parallel, and one or more inclined surfaces through which a distant object can be viewed and from which an image of the sight produced by the parallel rays will be reflected in a backward direction.

9. A sighting device for guns, comprising a sight, means whereby luminous rays proceeding therefrom are rendered parallel, one or more pieces of transparent material having parallel surfaces inclined to the line of sight through said device, through which a distant object can be seen, and by which an image of the sight will be reflected in a backward direction.

10. A sighting device for guns, comprising a sight, an object-glass whereby luminous rays proceeding therefrom are rendered parallel, and one or more reflecting-surfaces arranged at an angle to the line of sight and upon which the parallel luminous rays are projected so as to produce a phantom image of said sight.

11. A sighting device for guns, comprising a tube, a diaphragm carried by said tube and bearing a design constituting the sight proper, means whereby luminous rays proceeding from said design or sight are rendered parallel, and a transparent body through which a distant object can be seen and having one or more inclined surfaces upon which the parallel luminous rays are projected so as to produce an image of said design or sight.

12. A sighting device for guns, comprising a tube provided with a diaphragm bearing a design constituting the sight proper, a transparent body having one or more inclined reflecting-surfaces external to said tube and through which a distant object can be seen, and an object-glass arranged to render luminous rays proceeding from said diaphragm parallel to one another and to direct said parallel rays onto said inclined reflecting surface or surfaces.

13. A sighting device for guns, comprising a tube provided with a diaphragm bearing a design constituting the sight proper, an object-glass capable of rendering luminous rays proceeding from said design parallel to one another, a transparent body through which a distant object can be viewed and from which an image of the design or sight, produced by the parallel luminous rays will be reflected, and transparent material arranged in front of said transparent body and capable of reducing the brilliancy of said distant object as seen through said transparent body.

14. A sighting device for guns, comprising a tube provided with a diaphragm bearing a design constituting the sight proper, means for directing light upon said diaphragm, an object-glass capable of rendering luminous rays proceeding from said diaphragm parallel to one another, and an inclined surface from which parallel rays both from the illuminated design and from a distant object can be caused to simultaneously enter the eye of an observer.

15. In a sighting device for guns, a tube provided with a diaphragm bearing a transparent design to constitute the sight proper, an object-glass arranged to render luminous rays proceeding from said design parallel to one another, and an inclined surface from which an image of the design produced by the parallel rays will be reflected and through which a distant object can be simultaneously viewed.

16. A sighting device for guns, comprising a tube provided with a diaphram bearing a transparent design to constitute the sight proper, a reflecting-surface external to said tube, inclined in a backward direction to the line of sight through said device, and through which a distant object can be viewed, a reflecting-surface within said tube whereby luminous rays proceeding from said design are reflected onto the external reflecting-surface and thence backward, and means arranged to render said rays parallel to one another before they reach the external reflecting-surface.

17. A sighting device for guns, comprising a tube having its axis parallel to the line of sight through said device, a diaphragm arranged at the forward part of said tube and bearing a design constituting the sight proper, one or more reflecting-surfaces external to said tube, inclined backward to the line of sight, and through which a distant object can be seen, a reflecting-surface whereby luminous rays from said design are bent at right angles and directed toward said inclined surface or surfaces, and an object-glass for rendering said rays parallel to one another before impinging upon said external reflecting surface or surfaces.

18. A sighting device for guns, comprising a tube provided with a diaphragm bearing a design constituting the sight proper, a transparent body external to said tube and inclined backward to the axis thereof, a right-angled prism having its inclined surface arranged to reflect luminous rays proceeding from said design onto the external reflecting-surface, and an object-glass arranged to render said rays parallel to one another before reaching the last-mentioned surface.

19. A sighting device for guns, comprising a tube provided with a diaphragm bearing a design constituting the sight proper, pieces of transparent parallel glass arranged external to said tube and inclined backward to the axis of said tube, a right-angled prism arranged within said tube so as to reflect luminous rays coming from said diaphragm onto the inclined surfaces of the parallel glass, and an object-glass arranged between said prism and pieces of parallel glass so as to render the luminous rays parallel to one another.

20. A sighting device for guns, comprising a tube having a diaphragm carrying the sight proper, a transparent body external to said tube and having one or more backwardly-inclined reflecting-surfaces, means for rendering luminous rays proceeding from said diaphragm and sight parallel to one another and directing them onto said inclined reflecting surface or surfaces, and transparent material adapted to be placed adjacent to said transparent body and to diminish the brilliancy of a distant object as seen through said transparent body.

21. A sighting device for guns, comprising a tube having a diaphragm carrying the sight proper, a transparent body external to said tube and having one or more backwardly-inclined reflecting-surfaces, means for rendering luminous rays proceeding from said diaphragm and sight parallel to one another and directing them onto said inclined reflecting surface or surfaces, and an incandescent electric lamp arranged to illuminate said diaphragm and sight.

22. A sighting device for guns, comprising a sighting-tube having one or more pieces of parallel transparent glass arranged across the axis thereof and inclined backward to said axis, a collimating-tube having a diaphragm provided with a transparent design, and means whereby luminous rays from said diaphragm are rendered parallel and directed onto the inclined surfaces of said transparent material.

23. A sighting device for guns, comprising a sighting-tube having one or more pieces of parallel glass extending across the same and inclined backward to the axis of said tube, a collimating-tube arranged parallel to said sighting-tube and provided with a diaphragm bearing a transparent design constituting the sight proper, a right-angled prism arranged in said collimating-tube so as to reflect luminous rays coming from said sight onto the inclined surfaces of the parallel glass, and an object-glass for rendering said luminous rays parallel.

24. A sighting device for guns, comprising a sighting-tube having one or more pieces of parallel transparent glass arranged across the axis thereof and inclined backward to said axis, a collimating-tube having a diaphragm provided with a transparent design, means whereby luminous rays from said diaphragm are rendered parallel and directed onto the inclined surfaces of said transparent material, and transparent material adapted to be placed in front of said parallel glass and diminish the brilliancy of a distant object as seen through said parallel glass.

25. A sighting device for guns, comprising a sighting-tube having one or more pieces of parallel transparent glass arranged across the axis thereof and inclined backward to said axis, a collimating-tube having a diaphragm provided with a transparent design, means whereby luminous rays from said diaphragm are rendered parallel and directed onto the inclined surfaces of said transparent material, and means whereby an additional amount of external light can be directed upon said diaphragm.

26. The combination with a gun of a sighting device adjustably mounted thereon and comprising a sight and means whereby luminous rays proceeding therefrom are rendered parallel before reaching the eye of an observer.

27. The combination with a gun of an adjustable sighting device comprising a sight, means whereby luminous rays proceeding therefrom are rendered parallel, and a reflecting-surface whereby views of the sight and a distant object can be superposed and viewed simultaneously.

28. A sighting device for guns, comprising a sight, means whereby luminous rays proceeding therefrom are rendered parallel, and a transparent body having a surface from which parallel luminous rays both from the sight and from a distant object can be caused to simultaneously proceed in a backward direction, said surface being coated with a film of a reflecting medium that will increase the reflecting power of said surface while allowing of the passage of rays of light therethrough.

Signed at Rathmines, Dublin, this 8th day of December, 1900.

HOWARD GRUBB.

Witnesses:
J. M. WILLIAMS,
N. O. WEBB.